(No Model.)
H. L. STEVENS.
LATHE MANDREL.
No. 308,639. Patented Dec. 2, 1884.
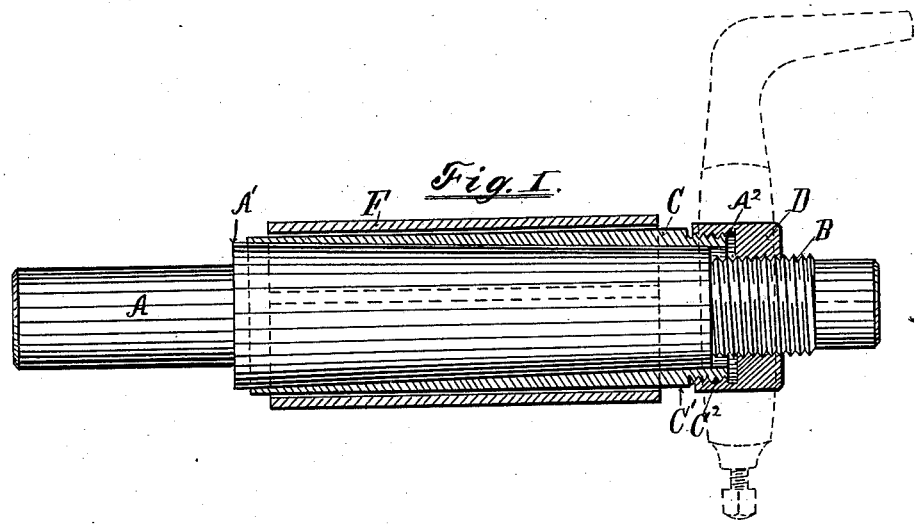
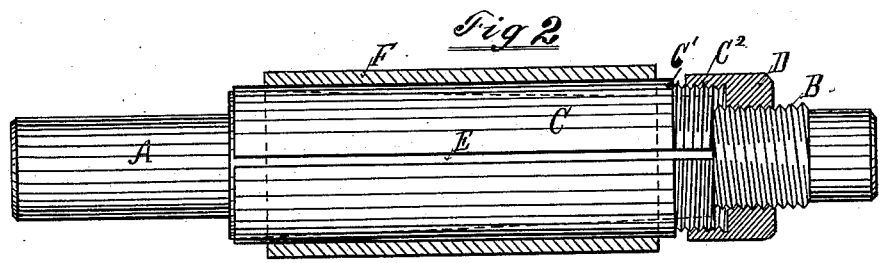
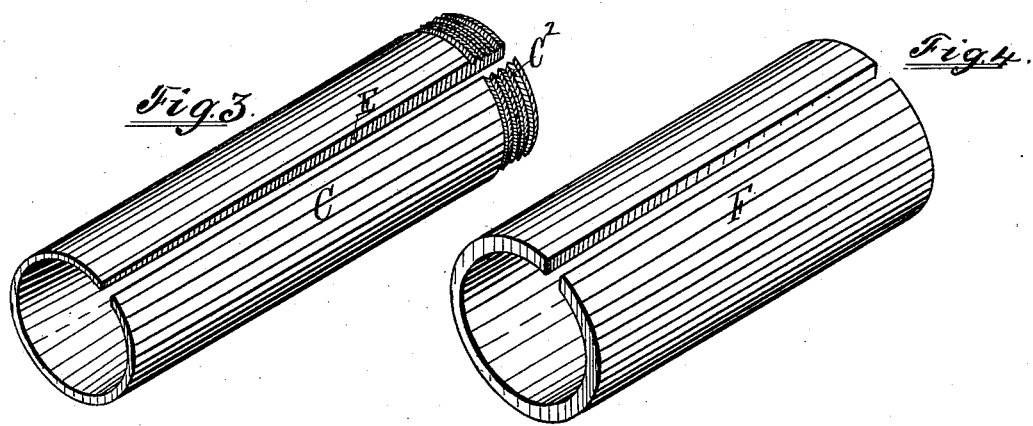
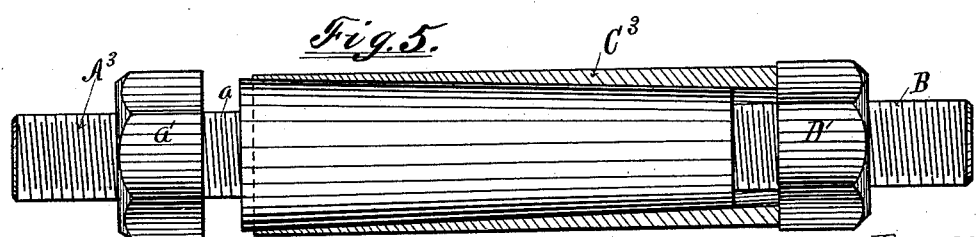
Witnesses
W. R. Edelen.
H. M. Sturgeon.
Inventor
Horace L. Stevens
Per H. Sturgeon
Att'y

UNITED STATES PATENT OFFICE.

HORACE L. STEVENS, OF ERIE, PENNSYLVANIA.

LATHE-MANDREL.

SPECIFICATION forming part of Letters Patent No. 308,639, dated December 2, 1884.

Application filed April 9, 1884. (No model.)

*To all whom it may concern:*

Be it known that I, HORACE L. STEVENS, a citizen of the United States, residing at Erie, in the county of Erie and State of Pennsylvania, have invented certain new and useful Improvements in Lathe-Mandrels; and I do hereby declare the following to be a full, clear, and exact description of the invention, such as will enable others skilled in the art to which it appertains to make and use the same, reference being had to the accompanying drawings, and to letters of reference marked thereon, forming part of this specification.

My invention relates to improvements in lathe-mandrels in which a tapering mandrel and a tapering sleeve are operated by screw-threads and a nut or nuts to secure work thereto.

The objects of my invention are, first, to provide a tapering lathe-mandrel with a split sleeve having an inside taper in the opposite direction to that of the mandrel, and adapted to be forced on and off the mandrel by means of screw-threaded nuts arranged thereon for that purpose; second, to provide auxiliary split sleeves of different thicknesses adapted to be slipped over the tapering sleeve of such mandrel, by means whereof the mandrel can be used in different sizes of work; third, to construct on the tapering mandrel a right and on the tapering sleeve a left hand thread, so that a single nut will operate to force the tapering sleeve on or off of the mandrel.

Other features of the invention will further appear in the specification and claims. The mechanism whereby I attain these objects is illustrated in the accompanying drawings, in which—

Figure 1 shows in elevation my improved mandrel with the bush, tapering split sleeve, and nut, sectioned longitudinally, and also showing a lathe-dog in dotted lines therewith. Fig. 2 shows in elevation my improved mandrel with the bush and nut sectioned longitudinally. Fig. 3 is a perspective view of the tapering split sleeve of my device detached from the mandrel. Fig. 4 is a perspective view of the auxiliary split sleeve used with my device. Fig. 5 shows in elevation a modified form of my device with the tapering split sleeve thereof sectioned longitudinally.

Like letters refer to like parts in all the figures.

In constructing my improved lathe-mandrel I construct the spindle A of any suitable metal, and with a gradual taper from the larger end A' to a point, A², near the opposite end. From the point A², I construct the spindle without any taper, and cut thereon preferably a right-hand thread, B. In the ends of the spindle A, I construct ordinary centers. (Not shown.) I then bore out a sleeve, C, with a tapering hole therein which will fit over the spindle A, but somewhat smaller than the spindle A from the point A² to A'. The outside of the sleeve C, I turn of like size throughout its entire length, and on one end, C', thereof I cut, preferably, a left-hand thread, C². I then split this tapering sleeve C longitudinally at E, so that when completed it is in the form shown in Fig. 3. I next construct a compound nut, D, one end whereof for half its length having a thread to fit thread B on the spindle A. The other end or half of the nut D, being bored out large enough, is provided with a thread to fit thread C² on the split sleeve C, so that, the sleeve C being slipped on the spindle A and the nut D applied, the operation of screwing up the nut D serves to force the split sleeve C over the taper surface from A² to A', which operates to increase the circumference of the outside of the split sleeve C by opening the split E therein, and by unscrewing the nut D the sleeve C is drawn back so that it resumes its normal circumference, thus enabling the operator to readily tighten the mandrel in a hole through the hub of pulley or other piece of work to be turned or otherwise operated upon in a lathe.

It will be obvious that the outside of the split sleeve C is of the same diameter at all points, so that it will fit closely and accurately the entire length of the opening through a pulley-hub or other piece of work to be attached thereto, thereby insuring the utmost accuracy of operation, the taper of the spindle A in one direction and of the inside of the split sleeve C in the other exactly compensating each other.

To provide for the varying sizes of openings in work in which a mandrel is or may be used, I provide auxiliary split sleeves F (shown in Fig. 4,) of different thicknesses, so that the mandrel may be fitted with any number of auxiliary sleeves, varying, for example, by thirty-seconds of an inch, if desired, so that by applying the proper thickness of auxiliary sleeve the mandrel can be adapted to fit any desired size of bore. The auxiliary split sleeves F are constructed substantially in the form shown in Fig. 4, and are bored out inside of even size throughout their entire length, so as to easily slip over the sleeve C when the nut D is turned back. The outside of the auxiliary split sleeve F is also turned of even size throughout its entire length.

In Fig. 5 I have shown a modification of my device. In this form of my device the spindle $A^3$ is constructed in all respects like that heretofore described, except that it is provided with an extra thread, $a$, and nut $a'$ on its other end. The split tapering sleeve $C^3$ thereof is not, however, provided with a thread, but is forced on the spindle $A^3$ by the action of the nut D', and forced off by means of the nut $a'$ at its opposite end. The auxiliary split sleeve F, used with this form of my device, is identical in construction and operation with those heretofore described.

The operation of my device is so obvious to those skilled in the art to which it appertains that further description thereof is unnecessary.

I have thus shown a simple and convenient mechanism for utilizing my invention; but I am aware that its construction and arrangement may in some particulars be modified by mechanics and others skilled in the art to which it appertains, and thereby attain good results, without departing from the spirit of my invention; therefore I do not desire to confine myself to the exact construction and arrangement of parts shown and described.

Having thus fully described my invention so as to enable others skilled in the art to which it appertains to construct and operate the same, what I claim as new, and desire to secure by Letters Patent of the United States, is—

1. In a lathe-mandrel, a tapering spindle having at one end thereof a screw-thread, and a tapering split-sleeve, one end of which is provided with a screw-thread having a pitch opposite to that on the spindle, in combination with a compound nut operating in both the thread of the spindle and the thread of the sleeve, substantially as and for the purpose set forth.

2. In a lathe-mandrel, a tapering spindle provided with a tapering split sleeve operated thereon by means of a nut or nuts, in combination with auxiliary split sleeves operating therewith, substantially as and for the purpose set forth.

3. In a lathe-mandrel, a tapering spindle having at one end thereof, a screw-thread, a split tapering sleeve, one end of which is provided with a screw-thread of opposite pitch to that on the spindle, and a compound nut adapted to operate said sleeve on said spindle, in combination with auxiliary split sleeves of different thicknesses, substantially as and for the purpose set forth.

4. In a lathe-mandrel, the combination of the tapering spindle A, provided with a screw-thread, B, the tapering split sleeve C, provided with a screw-thread, $C^2$, and the compound nut D, all constructed and operating together substantially as set forth.

5. In a lathe-mandrel, the combination of the tapering spindle A, the tapering sleeve C, and the compound nut D with the auxiliary split sleeve F, all constructed and operating together substantially as set forth.

In testimony whereof I affix my signature in presence of two witnesses.

HORACE L. STEVENS.

Witnesses:
H. M. STURGEON,
WM. P. HAYES.